(12) United States Patent
Aryanpour et al.

(10) Patent No.: US 11,205,807 B2
(45) Date of Patent: Dec. 21, 2021

(54) COMPUTATIONALLY SCREENING THE STABILITY OF BATTERY ELECTRODE MATERIALS WITH MIXTURES OF REDOX COUPLE ELEMENTS

(71) Applicant: Samsung Electronics Co., Ltd., Suwon-si (KR)

(72) Inventors: Masoud Aryanpour, Malden, MA (US); Young-Gyoon Ryu, Lexington, MA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 897 days.

(21) Appl. No.: 14/161,440

(22) Filed: Jan. 22, 2014

(65) Prior Publication Data
US 2015/0204924 A1    Jul. 23, 2015

(51) Int. Cl.
*H01M 10/48* (2006.01)
*H01M 10/04* (2006.01)
(Continued)

(52) U.S. Cl.
CPC ............ *H01M 10/48* (2013.01); *H01M 4/04* (2013.01); *H01M 4/36* (2013.01); *H01M 10/04* (2013.01); *H01M 10/4285* (2013.01)

(58) Field of Classification Search
CPC ....... H01M 10/00–0563; H01M 10/42; H01M 10/4285; H01M 10/48–488
See application file for complete search history.

(56) References Cited

U.S. PATENT DOCUMENTS

| | | |
|---|---|---|
| 6,350,543 B2 | 2/2002 | Yang et al. |
| 7,258,821 B2 | 8/2007 | Yang et al. |

(Continued)

FOREIGN PATENT DOCUMENTS

| | | |
|---|---|---|
| JP | 2009258083 A | 11/2009 |
| JP | 2012004110 A | 1/2012 |

OTHER PUBLICATIONS

Crompton, T (2000). Battery reference book. (3rd ed.) (pp. 2/1-2/23) (Year: 2000).*

(Continued)

*Primary Examiner* — Jonathan Crepeau
*Assistant Examiner* — Jacob Buchanan
(74) *Attorney, Agent, or Firm* — Cantor Colburn LLP

(57) ABSTRACT

A mixture stability criterion asserts that a mixture of at least two redox elements in a crystal lattice will be unstable during charge and discharge cycles unless a set of charged ground state configurations at a specified value of a mixing ratio for the redox elements and a set of discharged ground state configurations at the same value of mixing ratio both consist of the same derivative superstructures. All members of the charged ground state set and all members of the discharged ground state set are within a same energy threshold value of the lowest-energy member of each set. The value for the energy threshold may represent a value of thermal energy calculated with Boltzmann's constant. Examples of alternative embodiments include a method for implementing the mixture stability criterion, computer hardware adapted to perform a method embodiment, and computer-readable media including a method embodiment.

18 Claims, 6 Drawing Sheets

(51) Int. Cl.
*H01M 10/42* (2006.01)
*H01M 4/04* (2006.01)
*H01M 4/36* (2006.01)

(56) References Cited

U.S. PATENT DOCUMENTS

| | | | |
|---|---|---|---|
| 7,498,275 | B2 | 3/2009 | Monzyk et al. |
| 9,257,697 | B2 | 2/2016 | Oya et al. |
| 2009/0061267 | A1 | 3/2009 | Monzyk et al. |
| 2009/0157369 | A1* | 6/2009 | Li ............ G16C 60/00 703/12 |
| 2009/0326696 | A1* | 12/2009 | Wang .......... H01M 10/058 700/103 |
| 2010/0230632 | A1 | 9/2010 | Adamson et al. |
| 2012/0037844 | A1 | 2/2012 | Ceder et al. |
| 2012/0053837 | A1 | 3/2012 | Viassolo et al. |
| 2012/0130690 | A1* | 5/2012 | Srivastava ........ G06F 19/704 703/2 |
| 2012/0130692 | A1* | 5/2012 | Li ............ H01M 10/00 703/2 |
| 2012/0130694 | A1* | 5/2012 | Srivastava ........ G16Z 99/00 703/6 |

OTHER PUBLICATIONS

Park, J (Ed.). (2012). Principles and applications of lithium secondary batteries (pp. 319-335) (Year: 2012).*

Van Der Ven, A., et al., "Vacancies in ordered and disordered binary alloys treated with the cluster expansion", Phys. Rev. B71, 054102, Feb. 2, 2005.

Heejin Kim et al., "Ab Initio Study of the Spdium Intercalation and Intermedieate Pjases in Na0.44MnO2 for Sodium Ion Battery", Chem Mater, 2012, 24(8), pp. 1205-1211.

Gus L.W.Hart, Lance J. Nelson, Rodney W. Forcade, "Generating derivative structures at a fixed concentration", Computational Materials Science 59 (2012) 101-107.

Lee, Dae Hoe, et al., "An advanced cathode for Na-ion batteries with high rate and excellent structural stability", Phys. Chem. Chem. Phys., 2013, 15, 3304 3312.

Meng, Ying Shirley and M. Elena Arroyo-de Dompablo, "First principles computational materials design for energy storage materials in lithium ion batteries" Energy Environ. Sci., 2009, 2, 589-609.

Mueller, Tim, et al., "Evaluation of Tavorite-Structured Cathode Materials for Lithium-Ion Batteries Using High-Throughput Computing", American Chemical Society, Chemistry of Materials, Mar. 15, 2011, 9 pages.

KR Patent Application No. 10-2014-0059301 Grant of Patent dated Apr. 28, 2021, with English Translation, 8 pages.

* cited by examiner

Group ID 6768 Discharged Ni-Co

Group ID 6768 Charged Ni-Co

Group ID 6768 Voltage Ni-Co

COMPUTATIONALLY SCREENING THE STABILITY OF BATTERY ELECTRODE MATERIALS WITH MIXTURES OF REDOX COUPLE ELEMENTS

TECHNICAL FIELD

An embodiment relates in general to battery electrode materials, and more particularly, to selecting an optimally stable derivative crystal structure for a mixture of redox elements for a battery electrode.

BACKGROUND

A material used for the manufacture of an electrode for an electric battery may include a mixture of at least two redox elements chemically bonded in a crystal lattice. At least one of the redox elements may optionally be a transition metal. Properties of a mixture of redox elements forming a redox couple depend on parameters including, but not limited to, a ratio of one redox element to other redox elements in the mixture, a location in a crystal lattice of each atom in the mixture, a temperature at which properties are determined, and geometric relationships between atoms in the crystal lattice. A ratio of a number of atoms of a redox element to a number of atoms of another redox element in a specified number of unit cells in the crystal lattice for the composition may be referred to as a mixing ratio. Each combination of mixing ratio and location of atoms within a crystal lattice represents a candidate structure whose properties may be calculated to predict the performance of a mixture of redox elements in an electric battery.

A mixing ratio may be varied by replacing at least one atom of a redox element in a unit cell for a crystal lattice with an atom of another redox element. However, a single unit cell may contain an insufficient number of redox element atoms to incrementally vary the mixing ratio by a desired magnitude of change by substituting one atom with another. In order to study intermediate mixing ratios between 100% of one redox element to 100% of another redox element in the composition, it may be necessary to group a number of unit cells into a larger structure referred to as a supercell so that a substitution of one atom by another atom corresponds to the desired incremental magnitude of change in mixing ratio. A supercell may be referred to as a derivative superstructure.

The number of candidate structures for a proposed mixture of redox elements may increase exponentially as the number of atoms in a supercell increases. The number of mixing ratios to be explored further increases the number of candidate structures. The number of candidate structures whose properties are to be calculated and compared with one another may be so large as to make computer calculation of properties of the mixture prohibitively expensive in time and computer resources and may make calculations intractable.

It may be possible to reduce the number of calculations needed to select an optimum structure by taking advantage of lattice symmetry in a crystal structure. Some supercells among the total set of candidate structures are equivalent to other supercells through geometric symmetry operations of the host crystal structure. Examples of geometric symmetry operations include translation and rotation of a unit cell or supercell within a crystal lattice. Supercells which are equivalent to other supercells through geometric symmetry may be considered as duplicate structures having the same physical properties. For example, a physical property such as density, solubility, melting point, voltage, charge capacity, chemical reactivity, and so on, has the same value for duplicate structures.

Methods have been proposed to limit calculations to symmetrically distinct configurations, that is, alternative supercell configurations which are rotationally and translationally distinct from one another. Methods which reduce the number of candidate structures by analysis of geometric symmetries may result in a linear rather than exponential increase in the number of candidate structures and a corresponding linear rather than exponential increase in computer resources needed to perform calculations as the number and types of atoms in a supercell and the number of candidate supercells increase. However, such methods do not account for the chemical properties of the proposed mixtures of redox elements and therefore fail to eliminate configurations with undesirable properties from subsequent calculations to be performed. For example, methods which select symmetrically distinct supercells without accounting for the chemical properties of the redox elements in a crystal lattice may not predict which derivative structures and mixing ratios for a proposed battery electrode material may be unstable when cycled between an electrically charged state and an electrically discharged state. By failing to eliminate configurations with undesirable chemical properties from all permutational candidates, the number of configurations to be explored may still be large enough to cause software execution faults in computer programs for identifying symmetrically distinct configurations.

For the foregoing reasons, selection of materials for battery electrodes using mixtures of redox elements could be improved by eliminating duplicate and unstable supercell configurations before candidate mixtures are subjected to experimental synthesis and characterization.

SUMMARY

An example of a method embodiment includes selecting a mixture having at least two redox elements in a first derivative superstructure, providing a plurality of derivative superstructures, with each of the plurality of derivative superstructures corresponding to an alternative permutation of a position of each of the at least two redox elements in the first derivative superstructure, and removing from the plurality of derivative superstructures all derivative superstructures which are not symmetrically distinct. The example of a method embodiment further includes applying a mixture stability criterion to the plurality of derivative superstructures, removing from the plurality of derivative superstructures all derivative superstructures which are not predicted to be stable, and after removing from the plurality of derivative superstructures all derivative superstructures which are not symmetrically distinct and which are not predicted to be stable, performing a stability analysis of all remaining derivative superstructures from the plurality of derivative superstructures.

An example of an alternative method embodiment includes specifying a battery electrode material comprising at least two redox elements, specifying a unit cell for a crystal lattice to be populated by the redox elements, and combining a selected number of the unit cell into a first derivative superstructure. The alternative method embodiment further includes generating a plurality of derivative superstructures, with each of the plurality of derivative superstructures corresponding to an alternative permutation of a lattice position for each of the at least two redox elements in the first derivative structure, reducing the plurality of derivative superstructures to a plurality of symmetrically distinct superstructures, reducing the plurality of symmetrically distinct superstructures to a plurality of superstructures predicted to be stable, and analyzing for stability the plurality of superstructures predicted to be stable.

An example of an apparatus embodiment includes a non-transitory computer-readable medium having a computer readable program code embodied on the computer readable medium. The computer readable program code is adapted to implement a method including receiving a parameter for a battery electrode material comprising at least two redox elements, receiving a unit cell for a crystal lattice to be populated by the redox elements, and generating a first derivative superstructure from at least one of the unit cell. The method implemented by the computer readable program code further includes generating a plurality of derivative superstructures, with each of the plurality of derivative superstructures corresponding to an alternative permutation of a lattice position of the at least two redox elements in the first derivative superstructure, reducing the plurality of derivative superstructures to a set of symmetrically distinct superstructures, and applying a mixture stability criterion to reduce the plurality of symmetrically distinct superstructures to a plurality of superstructures predicted to be stable.

Another example of an apparatus embodiment includes a central processing unit implemented in hardware, a data memory implemented in hardware and electrically connected to the central processing unit, and a user input device in data communication with the central processing unit. The central processing unit is adapted to receive program instructions and execute the program instructions to perform receiving into the data memory a parameter for a battery electrode material comprising at least two redox elements, receiving a unit cell for a crystal lattice to be populated by the redox elements, and generating a first derivative superstructure from at least one of the unit cell. The program instructions executed by the central processing unit further perform generating a plurality of derivative superstructures, with each of the plurality of derivative superstructures corresponding to an alternative permutation of a lattice position of the at least two redox elements in the first derivative superstructure, reducing the plurality of derivative superstructures to a set of symmetrically distinct superstructures, and applying a mixture stability criterion to reduce the plurality of symmetrically distinct superstructures to a plurality of superstructures predicted to be stable.

BRIEF DESCRIPTION OF THE DRAWINGS

Accompanying drawings show one or more embodiments; however, the accompanying drawings should not be taken to limit the invention to only the embodiments shown. Various aspects and advantages will become apparent upon review of the following detailed description and upon reference to the drawings in which.

DESCRIPTION

Figure 1:
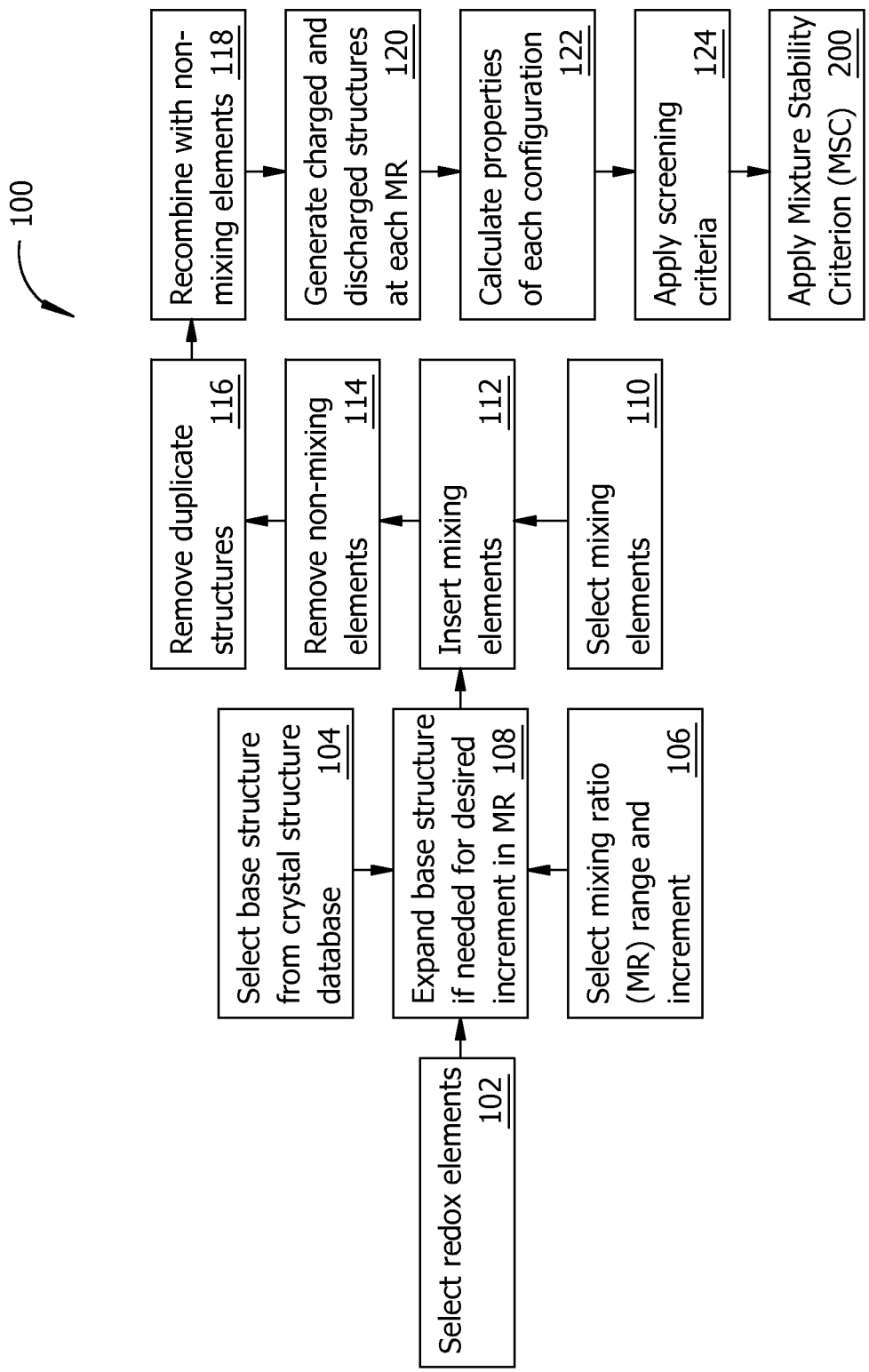
FIG. 1 is a diagram illustrating an example of a method in accord with an embodiment for generating a set of derivative structures for mixtures of redox elements.

A mixture stability criterion (MSC) applied to a set of derivative superstructures identifies a ratio of redox elements predicted to be stable when a mixture of at least two redox elements in a crystal lattice is subjected to charge and discharge cycles. The MSC compares calculated properties of mixtures for different combinations of mixing ratios and derivative superstructures and identifies which combinations may be eliminated from further analysis of mixture properties. The mixture stability criterion may result in selection of a mixture of at least two redox elements in a specified ratio to one another as a preferred chemical composition for a battery electrode material.

Embodiments adapted to implement the MSC remove chemically unstable configurations from a set of configurations whose properties are to be evaluated for use in a battery electrode material. As used herein, a "configuration" refers herein to a distinct, well-characterized arrangement of specified atoms of chemical elements at known locations in a unit cell for a crystal lattice. A configuration may also refer to a well-characterized arrangement of specified atoms in a supercell comprising a specified number of unit cells. An embodiment adapted to implement the MSC identifies a configuration having the lowest calculated value of energy per atom at a specified mixing ratio of at least two redox elements and at a specified charging state, for example an electrically charged state or an electrically discharged state. The charged configuration having the lowest value of energy per atom, which may also be referred to as a charged ground state configuration, is included in a set of charged ground states for a specified value of mixing ratio. All other configurations at the same mixing ratio within a specified energy threshold value of the charged ground state are included in the set of charged ground states. Similarly, the ground state configuration for the discharged state is included in a set of discharged ground states for the same specified value of mixing ratio, and all other configurations at the same mixing ratio within the specified energy threshold value of the discharged ground state are included in the set of discharged ground states.

The mixture stability criterion is satisfied when the set of charged ground states is identical to the set of discharged ground states, that is, the charged ground state set includes exactly the same members as the discharged ground state set. The order in which set members appear in two equal sets need not be the same in both sets, and the MSC is not applied to null sets. Two sets are considered to be unequal to one another when either set contains a member that is not included in the other set. When the mixture stability criterion is satisfied, the candidate derivative structure for the mixture of redox elements is predicted to be stable at the specified mixing ratio. A derivative structure for a mixture is unstable when a set of charged ground states is not equal to a set of discharged ground states at the corresponding value of mixing ratio for the derivative structure. Configurations which do not meet the MSC may be excluded from subsequent analysis of material properties, for example numerical analysis of material properties or analysis by synthesis and measurement of the mixture.

The MSC identifies mixing ratios associated with stable configurations and may be used to eliminate unstable configurations from a set of all structurally unique permutational combinations of atoms in a crystal lattice. Embodiments are advantageous for predicting the stability of a redox mixture in a battery electrode material undergoing charge-discharge cycles. Embodiments are further advantageous for eliminating unstable configurations from subsequent analysis to determine suitability for use of the corresponding mixture of redox elements in a battery electrode. Embodiments implementing the MSC reduce the number of candidate mixtures of transition metals synthesized to assess mixture stability during charge and discharge cycles. Eliminating unstable configurations may reduce an amount of time needed for completing calculations of measurable properties of a composition related to performance of the composition in a battery. Apparatus in accord with an embodiment may successfully complete calculations in computer hardware having substantially less computer memory than would be required for prior art methods.

The term "battery" refers herein to an electrochemical cell. While the term "battery" may imply a combination of two or more electrochemical cells, the disclosure herein that is applicable to a single electrochemical cell is also applicable to a battery containing multiple electrochemical cells.

Stability refers herein to a conditional comparison between two or more chemical compositions having well-defined energy states and spatial locations for each atom in a crystal lattice. Examples of stability include, but are not limited to, stability of a chemical compound with respect to other compounds and stability of a compound with respect to oxygen gas at various voltage conditions. For example, a mixture of redox elements may be more stable than another mixture of redox elements when a quantum calculation of energy per atom for one of the mixtures is less than the calculated energy per atom for the other mixture by an amount that is greater than or equal to a specified energy threshold value. Two mixtures have approximately the same stability when the calculated values of energy per atom for each mixture differ from one another by an amount having a magnitude that is less than or equal to a specified energy threshold value. However, a configuration for the mixture with the lowest calculated energy per atom at a selected ratio of redox elements may not represent a preferred material choice for an electrode because the configuration of atoms in the material's crystal lattice may be stable in one charged state but unstable in the complementary charged state.

An example of a method embodiment 100 is shown as a block diagram in FIG. 1. At block 102, at least two redox elements are selected for populating specific locations in a base structure selected from a crystal structure database in block 104. The spatial coordinates of each position for an atom in the selected base structure will be well known. At least one of the redox elements may optionally be a transition metal or another element capable of participating in a redox couple. The base structure may correspond to a unit cell in a crystal lattice. Selecting a base structure optionally includes selecting a size and geometric configuration of a unit cell for a crystal lattice. Alternately, a parameter for a base structure may be received by an embodiment from an external system. The parameter for the base structure may represent a reference number assigned to a base structure, a specification of a geometric attribute, or another characteristic of a base structure. A base structure may optionally be described by more than one parameter. An embodiment may optionally receive more than one parameter relating to a base structure. The redox elements may optionally be selected to achieve a preferred value of voltage in a charged state. Alternatively, the redox elements may be selected to achieve a preferred charge capacity in a charged state.

A range for the values of mixing ratios of the redox elements is specified in block 106, as is an increment in values of mixing ratios with the specified range. In block 108, the base structure may be expanded into a larger structure, referred to herein as a derivative structure or alternately referred to as a supercell. A first redox element is isolated from a base material, and a mixing element is substituted for a selected number of atoms of a second redox element. For example, suppose a unit cell selected in step 104 has one atom of a redox element "A" and one atom of a different redox element "B", where A and B represent two chemical elements which may form a redox couple. If the properties of mixtures of A and B are to be determined at mixing ratios from 10% A to 90% A in intervals of 10%, for example at intermediate values 20% A, 30% A, and so on, then ten unit cells may be grouped into a supercell as suggested in block 108 so that the mixing ratio can be varied in 10% increments by selectively substituting one or more atoms of element A with atoms of a mixing element. Mixing elements are inserted into the supercell structure in step 112 and non-mixing elements are removed from the structure in step 114, where non-mixing elements are any elements which will not affect the calculation of mixing ratios. After block 114, a set of candidate supercells may include all permutations of spatially translated or spatially rotated supercells at each incremental value of mixing ratio. Such a set of permutational combinations of derivative structures may include so many members that calculations would be untenable, even for a very large computer system. It may therefore be advantageous to eliminate duplicate structures from subsequent calculations, particularly by removing supercells which are neither rotationally nor translationally distinct from other supercells.

For a mixture including more than two redox elements, more than one mixing ration may be specified, for example a separate mixing ratio and optionally a separate range of mixing ratios for each redox element. Some redox elements in a supercell may have a different increment between mixing ratios than other redox elements in the same supercell.

Duplicate structures are removed in block 116, for example by execution of a computer software program adapted to analyze geometric symmetries of combinations of unit cells. The open-source software program "enumlib", an example of a software program adapted to remove duplicate structures, implements methods described by Hart et al. in "Generating derivative structures at a fixed concentration", Computational Materials Science 59 (2012) 101-107. Other software programs adapted to remove duplicate structures may alternatively be used instead of "enumlib". However, "enumlib" or other software programs for removing duplicate structures may halt without successfully identifying a complete set symmetrically-distinct derivative superstructures when the set of supercell permutations is too large, as may occur when many mixing ratios are to be explored, many unit cells are combined into one supercell, or when more than two redox elements are to be included in a mixture.

Removing duplicate structures from the initial set of permutational combinations results in a set of symmetrically distinct supercell configurations that have been selected according to their geometric properties, without reference to the chemical properties of the mixtures. For example, a selected supercell will preferably be removed from a set of supercells including all permutational combinations of mixing ratios, mixing element positions, rotations of the supercell in the crystal lattice, and translations of the supercell in the crystal lattice when the selected supercell is not rotationally distinct from another supercell in the set. In block 118, non-mixing elements removed in block 114 are returned to the symmetrically distinct supercells resulting from block 116. In block 120, the set of symmetrically distinct structures from block 118 is replicated to generate two sets having the same membership of derivative structures, but with one set of structures electrically charged and the other electrically discharged. A charged structure may be formed from a discharged structure by removing all charge carrier elements from a supercell. A discharged structure may be formed by introducing charge carrier elements inside the corresponding atomic structure of the charged system. The properties of each configuration are calculated in block 122 for the charged and discharged sets.

At block 122, properties of each structurally distinct derivative structure are calculated. A structurally distinct derivative superstructure may also be referred to herein as a unique configuration. Examples of chemical properties which may be calculated for each unique configuration of a battery electrode material include, but are not limited to, energy storage capacity, ionic conductivity, and stability. Stability may optionally be determined by a comparison of calculated values of energy per atom for different configurations of redox element atoms in a supercell, for charged and uncharged states of a supercell, or by other quantitative comparisons.

At block 124, the set of unique configurations may be reduced by eliminating configurations that do not meet one or more optional screening criteria. Examples of screening criteria include, but are not limited to, minimum and maximum values for energy storage capacity, ionic conductivity, and stability. Screening criteria may optionally be combined with one another. A calculated value falling outside a specified range of minimum and maximum values for a screening criterion may eliminate a configuration from further calculations and comparisons. In the example of FIG. 1, the MSC criterion is applied after block 124. Following application of the MSC criterion in block 200, chemical and physical properties of the stable configurations identified by the MSC may be calculated or may be determined by synthesis of the mixtures and analysis of mixture properties.

Figure 2:
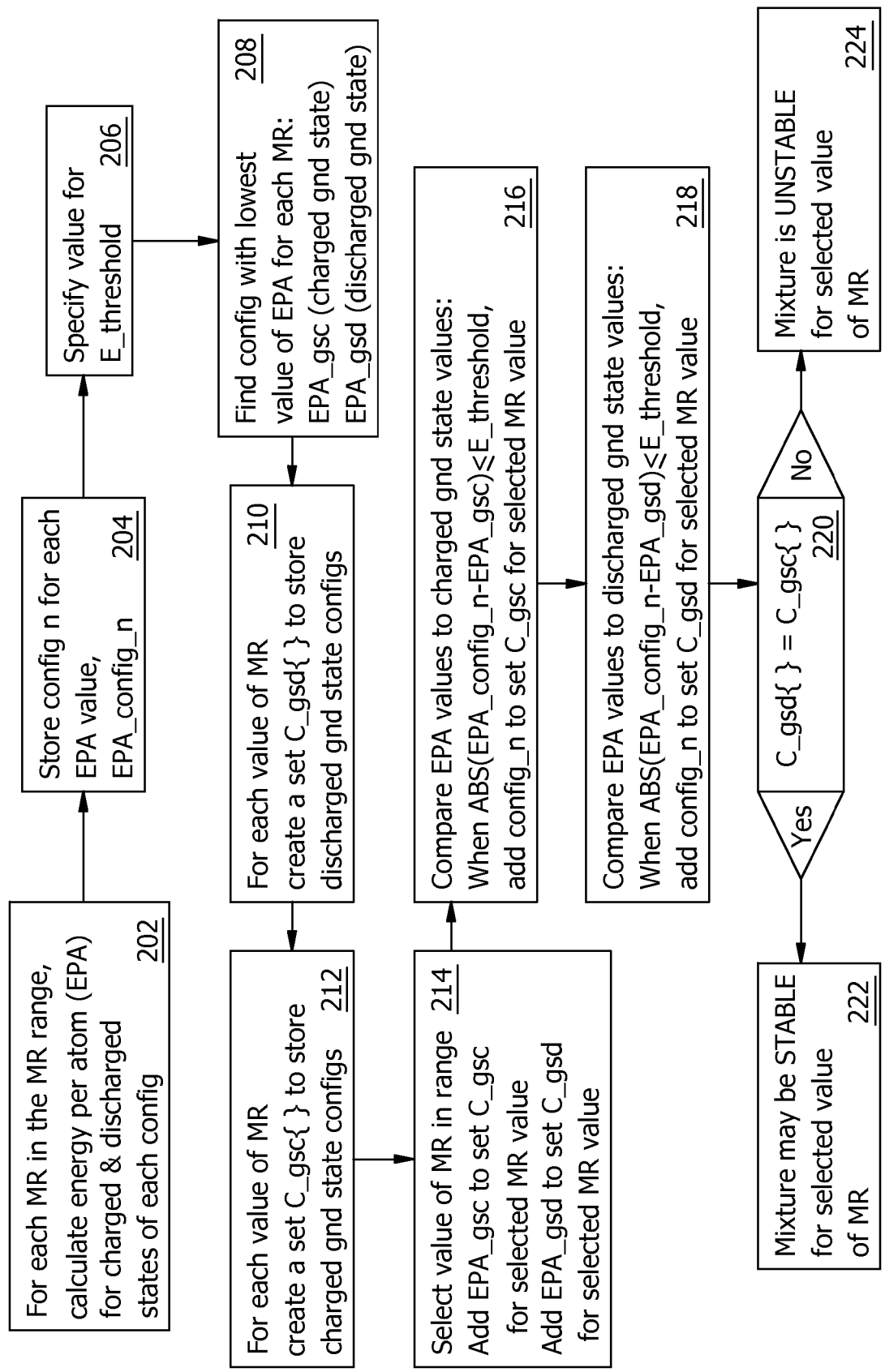
FIG. 2 is a diagram illustrating an example of operations performed by an embodiment to determine if a mixture of redox elements satisfies a mixture stability criterion.

An example of a method embodiment 200 of the mixture stability criterion is shown in FIG. 2. All operations in the example of FIG. 2 occur at a specified temperature T of a composition including at least two redox elements. Embodiments of the mixture stability criterion are effective for identifying stable configurations of a crystal lattice including a mixture of two, three, four, or more redox elements, where any one or more of the redox elements may optionally be a transition metal or alternatively any other element capable of forming a redox couple. At block 202, a numerical value corresponding to a quantity of energy per atom (EPA) is calculated for each configuration. Separate calculations are made for charged and discharged states of each configuration at each mixing ratio specified in block 106 of FIG. 1. In block 204, each EPA value and parameters for specifying the supercell configuration corresponding to each EPA value, EPA_config_n, are stored in a memory device accessible to a central processing unit (CPU) in a computer system, for each of "n" integer number of symmetrically distinct supercells. Each symmetrically distinct supercell may optionally be identified by a unique "configuration number" corresponding to the integer value of "n" associated with a supercell.

A numerical value for an energy threshold E_threshold may be specified in block 206. E_threshold may correspond to a material design parameter that depends on environmental factors. E_threshold may optionally be assigned a thermal energy value EK_thermal, where EK_thermal may be calculated by equation 1:

$$EK\_thermal = 3k_B T/2 \qquad (1)$$

where $k_B$ is Boltzmann's constant and T is the temperature of the mixture in degrees Kelvin. At room temperature (25° C., 298 K) EK_thermal is approximately equal to 39 millielectronvolts (meV). Alternative values for E_threshold may be calculated to include the effects of other environmental parameters, for example pressure and voltage. A value for E_threshold may alternatively be specified earlier than suggested in FIG. 2, for example after block 108 in FIG. 1, after block 120, and so on. E_threshold may be used for predicting mixture stability in charged and discharged states, as will be explained in more detail below.

After calculating an EPA value for each of "n" configurations, the example of a method embodiment 200 continues at block 208 by identifying the configuration having a lowest value of EPA at each value of mixing ratio (MR). The configuration having the lowest value of EPA at each value of MR corresponds to a ground (gnd) state configuration for each value of MR. For each MR, a charged ground state EPA_gsc and a discharged ground state EPA_gsd are determined. At block 210, one or more sets C_gsd{ } are created to store configurations of discharged ground states. A separate set C_gsc{ } may be created for each value of MR. At block 212, one or more sets C_gsc{ } are created to store configurations of charged ground states, optionally with a separate set C_gsc{ } for each value of MR. A configuration may optionally be represented in sets C_gsd{ } and C_gsc{ } by a corresponding configuration number or alternatively by another identifier unique for each configuration. At block 214, an MR value is selected from the range of MR values, the charged ground state configuration EPA_gsc is added to set C_gsc for the selected MR value, and the discharged ground state configuration EPA_gsd is added to set C_gsd for the selected MR value.

Other EPA values may be close enough to the lowest EPA value, i.e., the ground state value, at a specified value of MR to be included in a set of ground state configurations for that value of MR. In block 216, each EPA value at a selected MR value is compared to the charged ground state value from block 208. When the comparison shown in expression (2) is satisfied, the configuration config_n for the EPA value is included in the set of charged ground state configurations for the selected MR value:

IF (ABS(EPA_config_$n$−EPA_gsc)≤E_threshold)
   THEN (include config_$n$ in set C_gsc{ })   (2)

where ABS( ) represents the absolute value of the quantity enclosed in parentheses, corresponding to a magnitude of energy difference between the EPA value for config_n and the EPA value for the ground state configuration at each value of MR.

In block 218, each EPA value at the same selected MR value as block 216 is compared to the discharged ground state value from block 208. When the comparison shown in expression (3) is satisfied, the configuration config_n for the EPA value is included in the set of discharged ground state configurations for the selected MR value.

IF (ABS(EPA_config_$n$–EPA_gsd)≤E_threshold)
THEN (include config_$n$ in set C_gsd{ })   (3)

For some configurations, an EPA value may not be computable, or may be computable in one charged state but not in the complementary charged state, perhaps because calculations fail to converge to a real, finite numerical value. Application of the MSC may be omitted from a stability determination for such configurations because configurations without a computable EPA value will not be stable during cycling between charged and discharged states.

Having formed sets of ground state configurations for the charged and discharged states of a mixture at different values of mixing ratios, stability of a mixture may be predicted by a comparison of set membership as shown at block 220. Sets C_gsc{ } and C_gsd{ } are compared by applying conventional mathematical rules for determining set equivalence. For a given value of mixing ratio, when the set of charged ground state configurations C_gsc{ } is equal to the set of discharged ground state configurations C_gsd{ }, the MSC is satisfied and the mixture at the corresponding value of MR is predicted to be stable, as indicated in block 222. When the set of charged ground state configurations C_gsc{ } is not equal to the set of discharged ground state configurations C_gsd{ }, the mixture is unstable at the corresponding mixing ratio as indicated in block 224.

Further analysis of mixture properties may be limited to configurations predicted to be stable, thereby reducing an amount of computational time needed to determine an optimum mixture for a battery electrode and correspondingly reducing demands on computer resources such as CPU speed or memory capacity. Synthesis of compounds may optionally be limited to mixtures predicted to be stable by operation of an embodiment. Mixtures of redox elements identified by the operations in FIGS. 1-2 may be synthesized and subjected to chemical analysis to determine stability and compatibility with other parts of a battery and suitability for environmental conditions the battery may be exposed to. An electric storage battery may be manufactured from a stable mixture identified by an embodiment.

As an example of an application of the MSC criterion in identifying derivative structures predicted to be unstable at selected values of a mixing ratio, consider a base material $Na_2NiO_2$ at room temperature with its constituent atoms arranged according to international crystallographic space group 36. The unit cell is expanded to include $Na_{16}Ni_8O_{16}$ in a supercell of eight unit cells to increase the number of distinct MR values which may be created by incremental substitution of one of the transition metal (TM) atoms with a mixing element. In this example, cobalt is chosen as the mixing element. The total number of configurations reduces to 34 unique configurations after duplicate structures are eliminated, for example by operation of the open-source software program enumlib. Quantum calculations are performed on 2*34=68 unique structures to give values of energy/atom in electron Volts (eV). Some of these structures are graphed in the example of FIG. 3 for discharged Ni—Co compositions and FIG. 4 for charged Ni—Co compositions.

Figure 3:
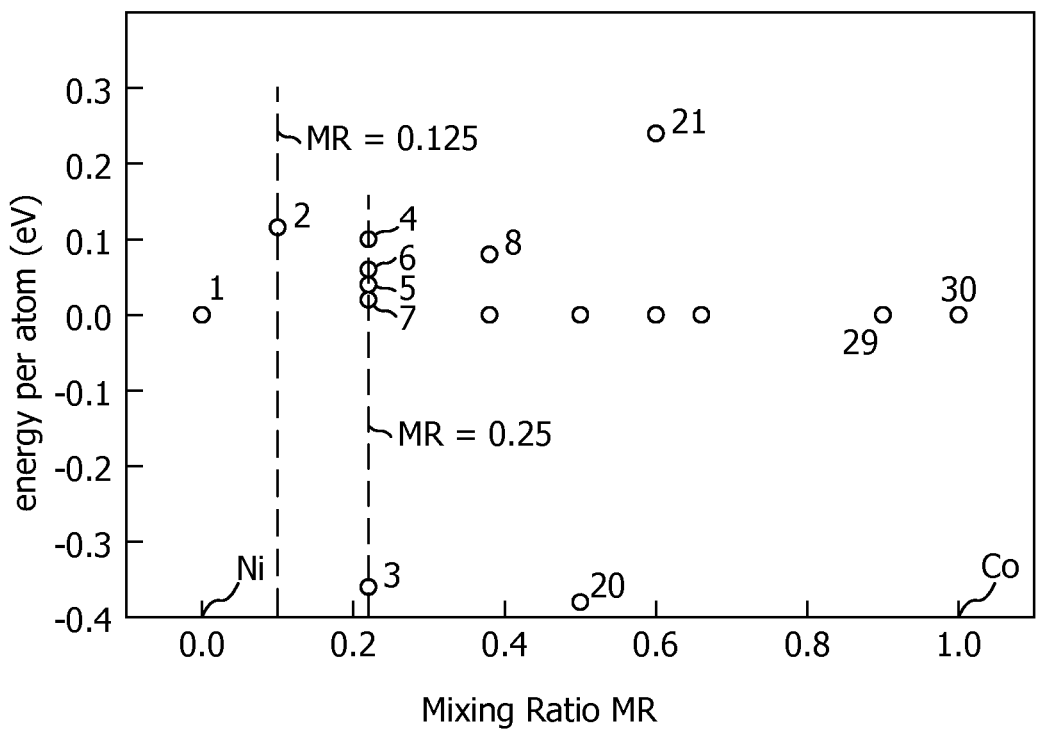
FIG. 3 is a graph of examples of calculated values of energy per atom for a range of mixing ratios for discharged configurations of mixtures of two transition metals, nickel and cobalt.
Figure 4:
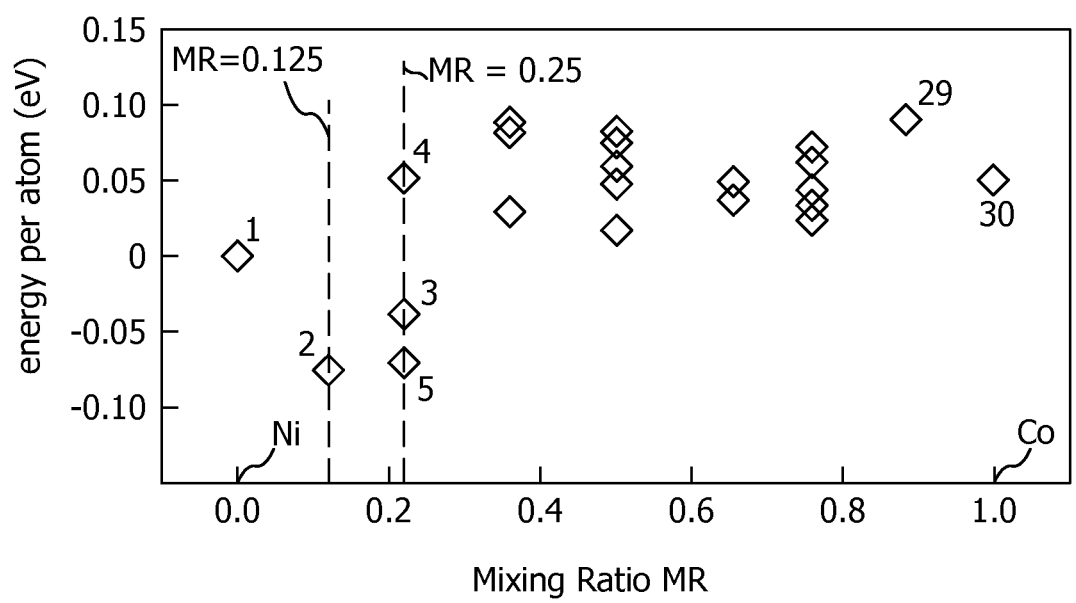
FIG. 4 is a graph of examples of calculated values of energy per atom for a range of mixing ratios for charged configurations of the mixtures from FIG. 3.

The lowest point at each Co/Ni ratio in FIGS. 3-4 corresponds to the most stable configuration at that MR, thereby representing a ground state configuration at each MR. Per FIG. 3, configuration 3 is added to set C_gsd{ }, that is, C_gsd{ }={3}. Configuration 7 at MR=0.25 differs from configuration 3 by more than E_threshold for E_threshold equal to 0.039 electron Volt (eV), so configuration 7 and the other configurations shown at MR=0.25 in FIG. 3 are omitted from set C_gsd{ }. In FIG. 4, configuration 5 is the ground state configuration and is added to set C_gsc{ }. Configurations 3 and 4 in FIG. 4 are both within E_threshold=39 meV of configuration 5, so set C_gsc{ }={5, 3, 4}, where the members of a set may be expressed in any order. Sets C_gsd{3} and C_gsc{3,4,5} do not include the same members, so the MCS criterion is not satisfied and MR=0.25 is unstable. However, at MR=0.125, FIG. 3 shows that EPA_gsd=configuration 2, so C_gsd{ }={2}. At MR=0.125, FIG. 4 shows that EPA_gsc=configuration 2, so C_gsc{ }={2}. Therefore, because C_gsc{2}=C_gsd{2}, the MCS criterion is satisfied and the composition at MR=0.125 is predicted to be stable.

Figure 5:
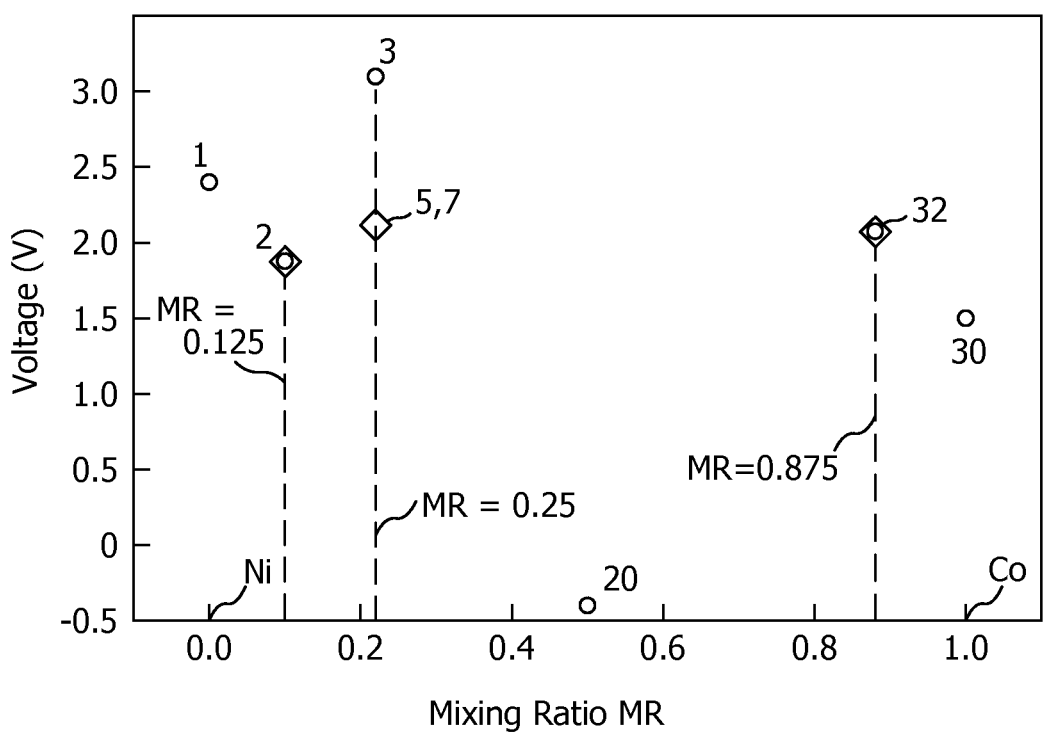
FIG. 5 is a graph of an example of a calculated material property for mixing ratios from FIGS. 3 and 4.

When sets C_gsc{ } and C_gsd{ } each include more than one set member, where a set member corresponds to a derivative superstructure, set members may be expressed in any order within each set. The MSC is satisfied and a corresponding value of mixing ratio is predicted to be stable when all the members of set C_gsc{ } are included in set C_gsd{ } and all the members of set C_gsd{ } are included in set C_gsc{ }. FIG. 5 shows that the voltages associated with the charged and discharged states of configuration are approximately equal, that is, the stability of configuration 2 is confirmed by determination of the mixture's properties after the MSC is applied.

An example of an alternative method embodiment includes selecting, or alternately receiving, a mixture comprising at least two redox elements in a first derivative superstructure, providing a plurality of derivative superstructures, with each of the plurality of derivative superstructures corresponding to an alternative permutation of a position of each of the at least two redox elements in the first derivative superstructure, removing from the plurality of derivative superstructures all derivative superstructures which are not symmetrically distinct, and applying a mixture stability criterion to the plurality of derivative superstructures. The alternative method embodiment further includes removing from the plurality of derivative superstructures all derivative superstructures which are not predicted to be stable, and after removing from the plurality of derivative superstructures all derivative superstructures which are not symmetrically distinct and which are not predicted to be stable, performing a stability analysis of any remaining derivative superstructures from the plurality of derivative superstructures.

The alternative method embodiment may optionally further include specifying, or alternately receiving, a plurality of mixing ratios of the at least two redox elements, and applying the mixture stability criterion may optionally include generating a plurality of charged superstructures from the plurality of derivative superstructures, generating a plurality of discharged superstructures from the plurality of derivative superstructures, identifying from the plurality of charged superstructures a plurality of charged ground state configurations, identifying from the plurality of discharged superstructures a plurality of discharged ground state configurations, selecting a value of mixing ratio from the plurality of mixing ratios, and when every derivative superstructure for the selected value of mixing ratio included in the plurality of charged ground state configurations is included in the plurality of discharged ground state configurations and every derivative superstructure for the selected value of mixing ratio included in the plurality of discharged ground state configurations is included in the plurality of charged ground state configurations, identifying a derivative superstructures at the selected value of mixing ratio in the plurality of charged ground state configurations as a derivative superstructure predicted to be stable.

Applying the mixture stability criterion in the alternative method embodiment may further optionally include: for each charged superstructure, calculating a value of energy per atom at each of the plurality of mixing ratios; for each discharged superstructure, calculating a value of energy per atom at each of the plurality of mixing ratios; at each of the plurality of mixing ratios, selecting a charged configuration having a lowest value of energy per atom as a charged ground state configuration; at each of the plurality of mixing ratios, selecting a discharged configuration having a lowest value of energy per atom as a discharged ground state configuration; including the charged ground state configuration in the plurality of charged ground state configurations; and including the discharged ground state configuration in the plurality of discharged ground state configurations.

Yet another alternative method embodiment includes specifying a battery electrode material comprising at least two redox elements, specifying, or alternately receiving, a unit cell for a crystal lattice to be populated by the redox elements, combining a selected number of the unit cell into a first derivative superstructure, and generating a plurality of derivative superstructures, with each of the plurality of derivative superstructures corresponding to an alternative permutation of a lattice position for each of the at least two redox elements in the first derivative structure. The alternative method embodiment further includes reducing the plurality of derivative superstructures to a plurality of symmetrically distinct superstructures, reducing the plurality of symmetrically distinct superstructures to a plurality of superstructures predicted to be stable, and analyzing for stability the plurality of superstructures predicted to be stable. Analyzing for stability may alternatively be performed by numerical analysis or by synthesis of each mixture having a combination of a superstructure and mixing ratio predicted to be stable.

The alternative method embodiment may further optionally include specifying, or alternately receiving, a plurality of mixing ratios of the at least two redox elements and applying a mixture stability criterion at each of the plurality of mixing ratios. Applying the mixture stability criterion at each of the plurality of mixing rations includes: generating a plurality of charged superstructures; generating a plurality of discharged superstructures; identifying a plurality of charged ground state configurations from the plurality of charged superstructures; identifying a plurality of discharged ground state configurations from the plurality of discharged superstructures; selecting a value of mixing ratio from the plurality of mixing ratios; and when every derivative superstructure for the selected value of mixing ratio included in the plurality of charged ground state configurations is included in the plurality of discharged ground state configurations and every derivative superstructure for the selected value of mixing ratio included in the plurality of discharged ground state configurations is included in the plurality of charged ground state configurations, identifying a derivative superstructures at the selected value of mixing ratio in the plurality of discharged ground state configurations as a derivative superstructure predicted to be stable.

For any of the examples of embodiments disclosed herein, when at least one derivative superstructure included in a plurality of charged ground state superstructures for a selected value of mixing ratio is not included in a plurality of discharged ground state superstructures for the selected value of mixing ratio, the derivative superstructure having the selected value of mixing ratio of redox elements is unstable. Furthermore, when at least one derivative superstructure included in a plurality of discharged ground state superstructures for a selected value of mixing ratio is not included in a plurality of charged ground state superstructures, the derivative superstructure having the selected value of mixing ratio of redox elements is unstable. An unstable configuration, that is, a derivative superstructure populated with redox elements in a selected mixing ratio determined by application of the MSC to be unstable, may be eliminated from subsequent analysis of properties of a battery electrode material. A derivative superstructure which is not rotationally distinct from another derivative superstructure may be eliminated from either one or both of the plurality of discharged ground state superstructures and the plurality of charged ground state superstructures.

Figure 6:
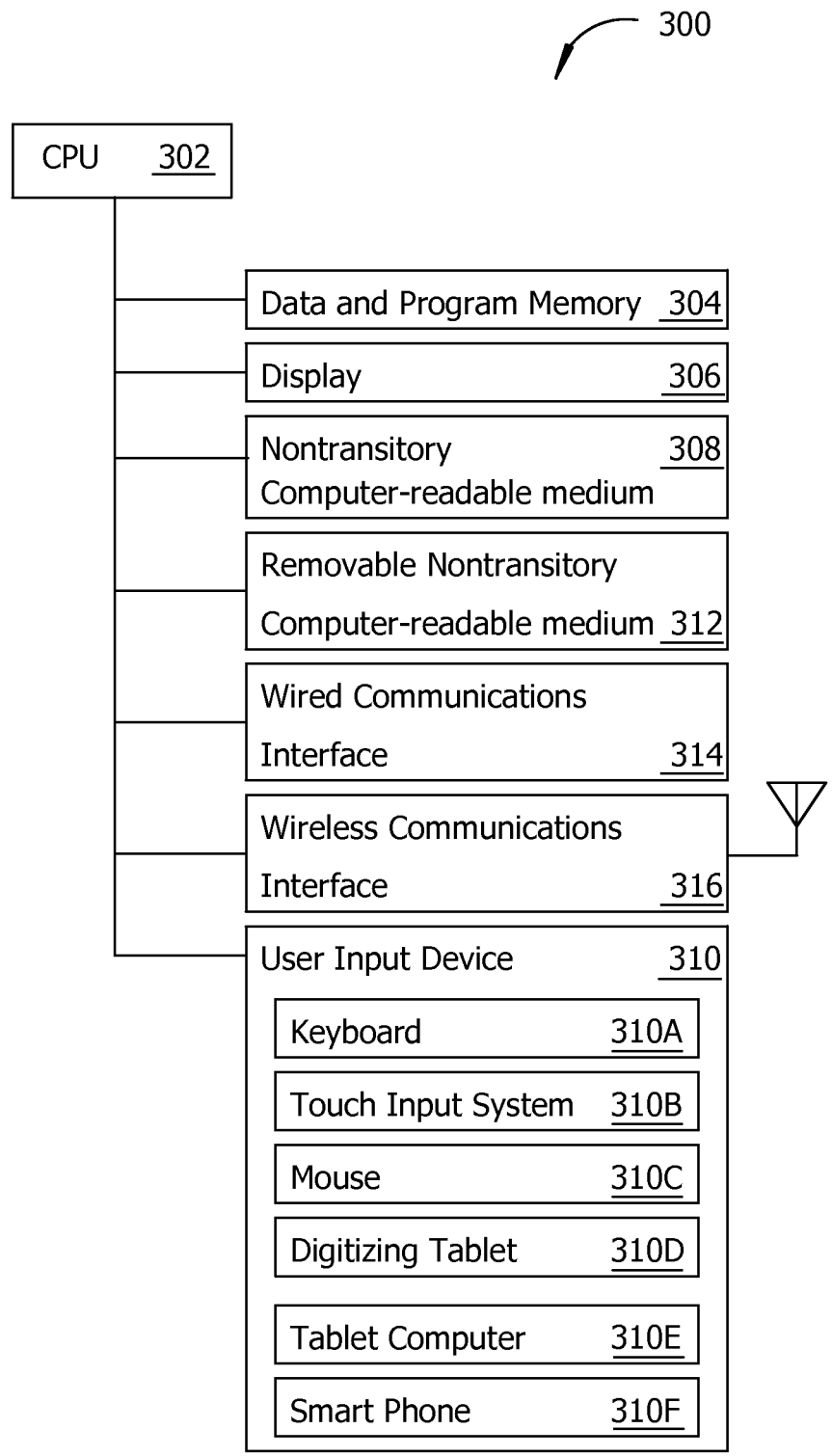
FIG. 6 is a diagram of an example of a computer system implemented as hardware and adapted to execute program instructions in accord with an embodiment.

An alternative embodiment includes a computer apparatus adapted to execute software instructions implementing a method embodiment, for example the method described by FIG. 1 and FIG. 2. FIG. 6 shows a block diagram representing a hardware implementation of an example of a computer apparatus embodiment. The computer apparatus 300 includes a central processing unit (CPU) 302 implemented as a hardware device. Hardware in accord with an apparatus embodiment 300 may be implemented as electrically interconnected semiconductor devices, possibly in the form of at least one integrated circuit. The CPU 302 is electrically connected for exchange of data and program instructions with a data and program memory 304 implemented in hardware. The CPU 302 further communicates with a display device 306, for example a liquid crystal display or a plasma display, a user input device 310, and a storage device including computer-readable media, for example a computer-readable medium 312 and optionally a removable computer-readable medium 312. Examples of a user input device 310 include, but are not limited to, a keyboard 310A, a touch input system 301B, a mouse 310C, a digitizing tablet 310D, a table t computer 310E, and a cellular telephone with a graphical user interface and Internet browsing capability, also referred to as a smart phone 310F. The CPU may optionally send and receive calculation results, input data, and program instructions through an optional wired communications interface 314, an optional wireless communications interface 316, or possibly through both wired and wireless communications interfaces (314, 316). Examples of wired communications interfaces include, but are not limited to, Ethernet, twisted pair, a parallel computer interface, an optical fiber network interface, and a serial computer interface. Examples of wireless communications interfaces include, but are not limited to, Bluetooth™, a cellular telephone network, IrDA, and Wi-Fi.

Program instructions may be embodied as nontransient electrical signals on storage media 308 and optionally on removable storage media 312, either of which may save and retrieve data in a form readable by the CPU 302. Calculated values resulting from program instructions may optionally be stored on the storage media 308, removable storage media 312, or possibly on both devices. Examples of removable storage media include, but are not limited to, magnetic disk media, optical disk media, and a nonvolatile memory device such as a semiconductor memory stick.

The CPU 302 may be adapted to receive program code from either one or both of the storage media devices (308, 312), either one or both of the communications interfaces (314, 316), the data and program memory 304, or a combination of one or more of these hardware subsystems. The CPU 302 may be adapted to execute the program code to perform a method in accordance with FIG. 1 and FIG. 2, including, but not limited to:

receiving into the data memory a battery electrode material comprising at least two redox elements;

receiving a unit cell for a crystal lattice to be populated by the redox elements;

generating a first derivative superstructure from at least one of the unit cell;

generating a plurality of derivative superstructures, with each of the plurality of derivative superstructures corresponding to an alternative permutation of a lattice position of the at least two redox elements in the first derivative superstructure;

reducing the plurality of derivative superstructures to a set of symmetrically distinct superstructures; and applying a mixture stability criterion to reduce the plurality of symmetrically distinct superstructures to a plurality of superstructures predicted to be stable.

Many of the operations described herein may be performed in a different order than implied by the sequence of blocks in FIG. 1 and FIG. 2. For example, in an alternative embodiment, the MSC may be applied to a plurality of derivative superstructures before the plurality of derivative superstructures is reduced to a plurality of symmetrically distinct configurations. Such variations are considered to be within the scope of the disclosed embodiments.

Unless expressly stated otherwise herein, ordinary terms have their corresponding ordinary meanings within the respective contexts of their presentations, and ordinary terms of art have their corresponding regular meanings.

What is claimed is:

1. A method for manufacturing an electric storage battery, the method comprising:

selecting a mixture comprising at least two redox elements selected from elements capable of participating in a redox couple in a first derivative superstructure;

generating, using a central processing unit, a plurality of derivative superstructures, with each of the plurality of derivative superstructures corresponding to an alternative permutation of a position of each of the at least two redox elements in the first derivative superstructure;

removing, using said central processing unit, from the plurality of derivative superstructures all derivative superstructures which are not symmetrically distinct;

applying, using said central processing unit, a mixture stability criterion to the plurality of derivative superstructures;

removing, using said central processing unit, from the plurality of derivative superstructures all derivative superstructures which are not predicted to be stable;

after removing from the plurality of derivative superstructures all derivative superstructures which are not symmetrically distinct and which are not predicted to be stable, performing a stability analysis, using said central processing unit, of all remaining derivative superstructures from the plurality of derivative superstructures by determining that a derivative superstructure is unstable when a set of charged ground states is not equal to a set of discharged ground states at a corresponding value of mixing ratio for the derivative superstructure;

selecting at least one of the remaining derivative superstructures as a battery electrode material based on the stability analysis; and further comprising:

synthesizing battery electrode material corresponding to the selection of at least one of the plurality of superstructures predicted to be stable as a battery electrode material based on the analyzing; and manufacturing the electric storage battery from the synthesized selected battery electrode material corresponding to the selection of at least one of the plurality of superstructures predicted to be stable as a battery electrode material based on the analyzing.

2. The method of claim 1, further comprising:

specifying a plurality of mixing ratios of the at least two redox elements; and applying the mixture stability criterion comprises:

generating a plurality of charged superstructures from the plurality of derivative superstructures;

generating a plurality of discharged superstructures from the plurality of derivative superstructures;

identifying from the plurality of charged superstructures a plurality of charged ground state configurations;

identifying from the plurality of discharged superstructures a plurality of discharged ground state configurations;

selecting a value of mixing ratio from the plurality of mixing ratios; and when every derivative superstructure for the selected value of mixing ratio included in the plurality of charged ground state configurations is included in the plurality of discharged ground state configurations and every derivative superstructure for the selected value of mixing ratio included in the plurality of discharged ground state configurations is included in the plurality of charged ground state configurations, identifying a derivative superstructures at the selected value of mixing ratio in the plurality of charged ground state configurations as a derivative superstructure predicted to be stable.

3. The method of claim 2, wherein applying the mixture stability criterion further comprises:

for each charged superstructure, calculating a value of energy per atom at each of the plurality of mixing ratios;

for each discharged superstructure, calculating a value of energy per atom at each of the plurality of mixing ratios;

at each of the plurality of mixing ratios, selecting a charged configuration having a lowest value of energy per atom as a charged ground state configuration;

at each of the plurality of mixing ratios, selecting a discharged configuration having a lowest value of energy per atom as a discharged ground state configuration;

including the charged ground state configuration in the plurality of charged ground state configurations; and including the discharged ground state configuration in the plurality of discharged ground state configurations.

4. A method for manufacturing an electric storage battery, the method comprising:

specifying a battery electrode material comprising at least two redox elements selected from elements capable of participating in a redox couple;

specifying a unit cell for a crystal lattice to be populated by the redox elements;

combining, using a central processing unit, a selected number of the unit cell into a first derivative superstructure;

generating, using said central processing unit, a plurality of derivative superstructures, with each of the plurality of derivative superstructures corresponding to an alternative permutation of a lattice position for each of the at least two redox elements in the first derivative superstructure;

reducing, using said central processing unit, the plurality of derivative superstructures to a plurality of symmetrically distinct superstructures;

reducing, using said central processing unit, the plurality of symmetrically distinct superstructures to a plurality of superstructures predicted to be stable;

analyzing for stability, using said central processing unit, the plurality of superstructures predicted to be stable by determining that a derivative superstructure is unstable when a set of charged ground states is not equal to a set of discharged ground states at a corresponding value of mixing ratio for the derivative superstructure; and selecting at least one of the plurality of superstructures predicted to be stable as a battery electrode material based on the analyzing; and further comprising:

synthesizing battery electrode material corresponding to the selection of at least one of the plurality of superstructures predicted to be stable as a battery electrode material based on the analyzing; and manufacturing the electric storage battery from the synthesized selected battery electrode material corresponding to the selection of at least one of the plurality of superstructures predicted to be stable as a battery electrode material based on the analyzing.

5. The method of claim 4, further comprising:

specifying a plurality of mixing ratios of the at least two redox elements;

applying a mixture stability criterion at each of the plurality of mixing ratios, comprising:
  generating a plurality of charged superstructures;
  generating a plurality of discharged superstructures;
  identifying a plurality of charged ground state configurations from the plurality of charged superstructures;
  identifying a plurality of discharged ground state configurations from the plurality of discharged superstructures;
  selecting a value of mixing ratio from the plurality of mixing ratios; and
  when every derivative superstructure for the selected value of mixing ratio included in the plurality of charged ground state configurations is included in the plurality of discharged ground state configurations and every derivative superstructure for the selected value of mixing ratio included in the plurality of discharged ground state configurations is included in the plurality of charged ground state configurations, identifying a derivative superstructures at the selected value of mixing ratio in the plurality of discharged ground state configurations as a derivative superstructure predicted to be stable.

6. The method of claim 5, wherein applying the mixture stability criterion further comprises:

for each charged superstructure, calculating a value of energy per atom for each of the plurality of mixing ratios;

for each discharged superstructure, calculating a value of energy per atom for each of the plurality of mixing ratios; and for each of the plurality of mixing ratios:
  including a charged superstructure having a lowest value of energy per atom in the plurality of charged ground state configurations; and
  including a discharged superstructure having a lowest value of energy per atom in the plurality of discharged ground state configurations.

7. The method of claim 6, further comprising:

providing a value for an energy threshold;

at the selected value of mixing ratio, calculating a magnitude of difference between the value of energy per atom for a selected charged superstructure to the value of energy per atom for the charged superstructure having the lowest value of energy per atom; and when the magnitude of difference is less than the value for the energy threshold, including the selected charged superstructure in the plurality of charged ground state configurations.

8. The method of claim 7, wherein the value for the energy threshold is determined by multiplying three (3) by Boltzmann's constant ($k_B$) and by a temperature (T) for the battery electrode material divided by two (2), $3 \times k_B \times T/2$.

9. The method of claim 6, wherein applying the mixture stability criterion further comprises:

providing a value for an energy threshold;

at the selected value of mixing ratio, calculating a magnitude of difference between the value of energy per atom for a selected discharged superstructure to the value of energy per atom for the discharged superstructure having the lowest value of energy per atom; and when the magnitude of difference is less than the value for the energy threshold, including the selected discharged superstructure in the plurality of discharged ground state configurations.

10. The method of claim 5, wherein when at least one derivative superstructure included in the plurality of ground state configurations for the selected value of mixing ratio is not included in the plurality of discharged ground state configurations for the selected value of mixing ratio, predicting a superstructure having the selected value of mixing ratio to be unstable.

11. The method of claim 10, further comprising eliminating the superstructure predicted to be unstable from subsequent calculations of properties the battery electrode material.

12. The method of claim 4, wherein at least one of the at least two redox elements is a transition metal.

13. The method of claim 4, wherein reducing the plurality of derivative superstructures to the plurality of symmetrically distinct superstructures comprises eliminating a derivative superstructure from the plurality of derivative superstructures when the derivative superstructure is not rotationally distinct from another derivative superstructure.

14. The method of claim 4, wherein the redox elements are selected to achieve a preferred value of voltage in a charged state.

15. The method of claim 4, where the redox elements are selected to achieve a preferred charge capacity in a charged state.

16. The method of claim 4, further comprising:

isolating a first redox element from a base material; and selecting a mixing element to substitute for a selected number of atoms of a second redox element.

17. A computer program product, comprising a non-transitory computer-readable medium having a computer readable program code embodied therein, the computer readable program code adapted to implement a method for manufacturing an electric storage battery, the method comprising:

receiving a parameter for a battery electrode material comprising at least two redox elements selected from elements capable of participating in a redox couple;

receiving a unit cell for a crystal lattice to be populated by the redox elements;

generating, using said program code, a first derivative superstructure from at least one of the unit cell;

generating, using said program code, a plurality of derivative superstructures, with each of the plurality of derivative superstructures corresponding to an alternative permutation of a lattice position of the at least two redox elements in the first derivative superstructure;

reducing, using said program code, the plurality of derivative superstructures to a set of symmetrically distinct superstructures;

applying, using said program code, a mixture stability criterion to reduce the plurality of symmetrically distinct superstructures to a plurality of superstructures predicted to be stable, including determining that a derivative superstructure is unstable when a set of charged ground states is not equal to a set of discharged ground states at a corresponding value of mixing ratio for the derivative superstructure; and selecting at least one of the plurality of superstructures predicted to be stable as a battery electrode material.

18. An apparatus, comprising:

a central processing unit implemented in hardware;

a data memory implemented in hardware and electrically connected to the central processing unit; and a user input device in data communication with the central processing unit, wherein the central processing unit is adapted to receive program instructions and execute the program instructions to perform:

receiving into the data memory a parameter for a battery electrode material comprising at least two redox elements selected from elements capable of participating in a redox couple;

receiving a unit cell for a crystal lattice to be populated by the redox elements;

generating, via said program instructions, a first derivative superstructure from at least one of the unit cell;

generating, via said program instructions, a plurality of derivative superstructures, with each of the plurality of derivative superstructures corresponding to an alternative permutation of a lattice position of the at least two redox elements in the first derivative superstructure;

reducing, via said program instructions, the plurality of derivative superstructures to a set of symmetrically distinct superstructures;

applying a mixture stability criterion, via said program instructions, to reduce the plurality of symmetrically distinct superstructures to a plurality of superstructures predicted to be stable by determining that a derivative superstructure is unstable when a set of charged ground states is not equal to a set of discharged ground states at a corresponding value of mixing ratio for the derivative superstructure; and selecting at least one of the plurality of superstructures predicted to be stable as a battery electrode material.

* * * * *